June 9, 1959  A. A. LUOMA ET AL  2,890,014
PRESSURE RESPONSIVE VALVE
Filed Dec. 19, 1955
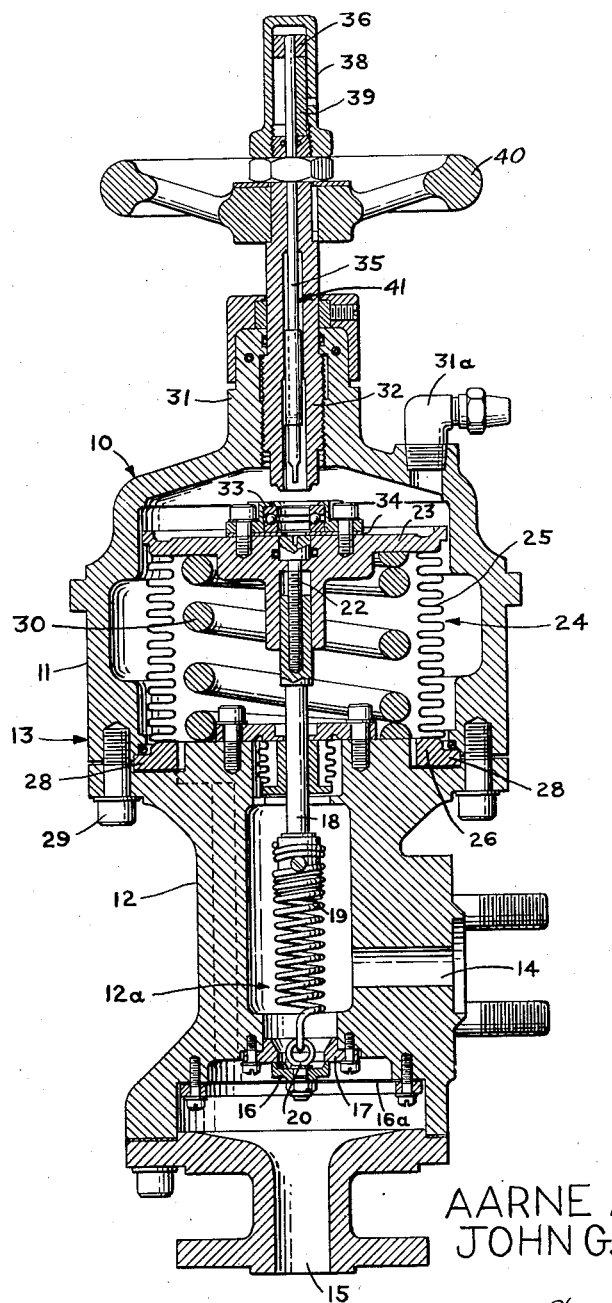
AARNE A. LUOMA
JOHN G. WILLIAMS
INVENTORS
BY Daniel H Bobro
ATTY United States Patent Office 2,890,014
Patented June 9, 1959

2,890,014

PRESSURE RESPONSIVE VALVE

Aarne A. Luoma, Wellsville, N.Y., and John G. Williams, Springfield, N.J., assignors to Worthington Corporation, Harrison, N.J., a corporation of Delaware Application December 19, 1955, Serial No. 553,977

7 Claims. (Cl. 251—14)

The present invention relates to an automatic valve and more particularly to a valve operated by a pressure signal transmitted thereto.

The valve of the present invention is provided with novel manual operating means for actuating the valve should the pressure signal which normally operates the valve fail.

The present invention further provides an automatic pressure responsive valve having adjusting means for setting the valve to operate for a different value of pressure signal transmitted thereto.

In accordance with the present invention, an automatic pressure responsive valve is disposed in a valve housing and adapted to seat against a valve seat to control the passage of fluid therethrough. The valve is actuated by a resilient member connected to a rigid valve stem operatively connected to a spring loaded bellows means disposed in the valve bonnet and responsive to a pressure signal transmitted thereto from an outside source. Adjustable screw means are provided in the bellows means for presetting the tensional force in the resilient member to adapt the valve to open for a different value of pressure signal transmitted to the bellows means.

Manual means comprising a threaded member extend into the valve bonnet and is adapted to engage the bellows means for operating the valve manually should the outside pressure signal thereto fail.

The invention will be better understood from the following description when considered in connection with the accompanying drawing forming a part thereof, and illustrating the valve of the present invention.

Referring to the drawing, the reference numeral 10 designates an automatic valve having a bonnet 11 and a body 12 forming a valve housing 13. Valve body 12 is provided with a fluid chamber 12a having an inlet passage 14 in communication therewith for flowing fluid thereto from a source, not shown, and an outlet passage 15 in communication therewith for discharging fluid therefrom. A valve cup or disc 16 is disposed in chamber 12a adapted to seat against a valve seat 17 therein for cutting off the flow of fluid therethrough. A valve rod or stem 18 is provided in bonnet 11 and body 12 connected at its lower end to a tension spring 19 disposed in chamber 12a and connected to a spring anchor assembly 20 fixed to the valve disc 16. Valve 16 is flexibly centered on seat 17 by spider diaphragm 16a. The upper end of valve stem 18 threadably engages an adjusting screw 22 mounted in the disc member 23 of a bellows assembly 24 disposed in bonnet 11 of the valve.

Bellows assembly 24 comprises a substantially cylindrical fluid tight bellows 25 secured at its upper end to the perimeter of disc member 23 and at its lower end to an annular ring 26. Ring 26 is provided with an outwardly extending flange portion 28 adapted to seat in circumferential grooves disposed in the lower edge of bonnet 11 and upper edge of body 12 and is held rigidly in the valve housing by bolt means 29 which clamp the bonnet and body to one another. A compression spring 30 is disposed inside the bellows and provides a force which normally urges disc member 23 upwardly in the bonnet to maintain valve disc 16 in a seated position. An inlet connection 31a is disposed in the upper portion of bonnet 11 in communication with the outside of bellows 25 to transmit an air pressure signal from a source, not shown, to disc member 23 to oppose the force in spring 30 and move valve stem 18 and tension spring 19 downwardly in the valve housing to unseat valve disc 16 and permit fluid to flow through the valve body.

Bonnet neck 31 is provided with a hollow manually operated valve stem 32 threaded therein and adapted to be threaded downward in bonnet 11 to engage an annular thrust bearing 33 mounted centrally on disc member 23 to move valve stem 18 manually to unseat valve disc 16 should the air pressure signal fail. A hand wheel 40 is keyed to the upper end of stem 32 for turning the valve stem.

A jack screw assembly generally designated 41 is provided for the valve to thread adjusting screw 22 in or out of valve stem 18 to thereby change the tensional force in tension spring 19 and set valve disc 16 to open in response to a different value of pressure signal transmitted to the valve. Jack screw assembly 34 comprises a jack screw 35 normally positioned within the bore of manually operated valve stem 32 but adapted to be lowered into the bonnet and through annular bearing 33 to engage the slotted head of screw 22. Adjusting screw 22 is prevented from moving axially of disc member 23 by a retainer plate 34 extending partly over the screw head and clamped rigidly between bearing 33 and the upper side of the disc member. The upper portion of jack screw 35 extends above stem 32 and is enclosed by upper cap member 38 threaded on the stem. A locking bar 39 is disposed in cap 38 between the jack screw handle 36 and valve stem 32 to prevent the jack screw from sliding downwardly into the valve bonnet 11 when not in use.

When it is desired to set valve 16 to open for a pressure signal of predetermined value transmitted to inlet connection 31a, cap 38 is removed from valve stem 32 and locking member 39 is removed from between handle 36 and the stem and the jack screw is moved downwardly in bonnet 11 until the rectangular shaped key on the lower end thereof engages the complementary slot in the adjusting screw head. Handle 36 is then rotated to thread screw 22 on the valve stem 18 until the tensional force in spring 19 is set to the value desired. Thus, the tensional force in spring 19 is adjusted to change the force in spring 30 which must be overcome by the pressure signal to unseat disc 16 from its seat. Thereafter, the jack screw is pulled upwardly until it is completely recessed within the lower end of valve stem 32 and the locking bar is inserted under handle 36 and cap 38 threaded back on the valve stem 32.

In operation, when the pressure signal transmitted through inlet connection 31a exceeds the force in spring 30 holding disc 16 seated against its seat, the bellows is compressed and moves downwardly in the bonnet moving adjusting screw 22, valve stem 18, and spring 19 downwardly therewith so that valve 16 is unseated from valve seat 17 to permit the flow of fluid through the valve chamber.

When the pressure signal decreases below the force in spring 30, the spring moves the disc 23 upwardly in the valve bonnet and adjusting screw 22, valve stem 18, and tension spring 19 therewith to seat valve 16 on its valve seat, thus cutting off the flow of fluid through the valve.

If the pressure signal to inlet connection 31a fails, the valve may be opened manually by turning hand wheel 40 to thread valve stem 32 downwardly into the valve bonnet in engagement with thrust bearing 33 to move the disc 23 and the bellows assembly downwardly to open the valve 16 manually.

Thus, the present invention provides an automatic valve operated in response to a pressure signal provided with means for operating it manually and having adjusting means thereon for setting the valve to operate in response to a pressure signal of a different value.

It will be understood that the invention is not to be limited to the specific construction or arrangement of parts shown but that they may be widely modified within the invention defined by the claims.

What is claimed is:

1. An automatic valve comprising a body having an inlet for passing fluid therein and an outlet for discharging fluid therefrom, a fluid-tight bonnet mounted on said body having an inlet therein for receiving a pressure signal therethrough, a valve seat in said body, a valve disc adapted to seat against said valve seat to control the flow of fluid through the body, a tension spring in said body fastened to said valve disc, a threaded valve stem fastened to said tension spring for moving said valve disc into an opened and closed position, and control means disposed in said bonnet for acting on said valve stem to seat and unseat said valve disc, said control means comprising a spring loaded fluid-tight bellows means, a disc member forming the top of said bellows means, adjustable screw means mounted in said disc member in spaced relation with said valve stem for adjusting the tension in said first mentioned spring, said bellows means being disposed in said bonnet to normally maintain said valve disc seated, said control means being operative by a pressure signal received through said pressure signal inlet to operate said valve stem to unseat said valve disc when the pressure signal increases above a predetermined value, and means in said body and in spaced relation with said valve disc for flexibly centering the valve disc in seated position.

2. The valve of claim 1 wherein jack means are provided for engaging said screw means to thread said screw means on said valve stem and change the tensional force in said tension spring to set said valve disc to unseat for a different value of pressure signal transmitted to the control means.

3. The valve of claim 1 wherein said bonnet is provided with a threaded hollow neck, and a manually operated threaded rod is disposed therein adapted to engage said disc member to unseat said valve disc when the pressure signal to the control means fails.

4. An automatic valve comprising a housing having an inlet for passing fluid therein and an outlet for discharging fluid therefrom, a fluid tight bonnet mounted on said housing, said bonnet having an inlet therein for receiving a pressure signal, valve means disposed in said housing for controlling the flow of fluid therethrough, valve operating means for said valve means including a spring member having one end connected to said valve means and having a rigid member associated therewith at the other end, adjustable means in said housing adapted to adjust the tension in said spring member so that said valve means is unseated at a predetermined pressure signal, and control means in said bonnet responsive to a pressure signal and operatively connected to said valve operating means to normally maintain said valve means in a seated position whereby when the pressure signal increases above a predetermined amount said control means operates said valve operating means to unseat said valve means, and means in said body and in spaced relation with said valve means for flexibly centering the valve means in seated position.

5. An automatic valve comprising a housing having an inlet for passing fluid therein and an outlet for discharging fluid therefrom, a fluid tight bonnet mounted on said housing, said bonnet having an inlet therein for receiving a pressure signal, a valve seat in said housing, a valve disc adapted to seat against said valve seat to control the flow of fluid through said housing, a spring in said body connected to said valve disc, a valve stem fastened to said spring for moving said valve disc into open and closed positions, adjusting means for said spring adapted to adjust the tension in said spring so that said valve means is unseated at a predetermined pressure signal, and control means in said bonnet responsive to a pressure signal and operatively connected to said valve stem to normally maintain said valve disc in a seated position, said control means comprising a spring loaded fluid tight bellows means having a disc at one end for receiving a pressure signal from said pressure signal inlet whereby when said pressure signal increases above a predetermined amount said control means operates said valve stem to unseat said valve disc, and means in said body and in spaced relation with said valve disc for flexibly centering the valve disc in seated position.

6. An automatic valve comprising a body having an inlet for passing fluid therein and an outlet for discharging fluid therefrom, a fluid-tight bonnet mounted on said body having an inlet therein for receiving a pressure signal therethrough, a valve seat in said body, a valve disc adapted to seat against said valve seat to control the flow of fluid through the body, a tension spring in said body fastened to said valve disc, a threaded valve stem fastened to said tension spring for moving said valve disc into an opened and closed position, means in said body and in spaced relation with said valve disc for flexibly centering the valve during the closed position, and control means disposed in said bonnet for acting on said valve stem to seat and unseat said valve disc, said control means comprising a spring-loaded fluid-tight bellows means, a disc member forming the top of said bellows means, adjustable screw means mounted in said disc member in spaced relation with said valve stem for adjusting the tension in the first mentioned spring, said bellows means being disposed in said bonnet to normally maintain said valve disc seated, said control means being operative by a pressure signal received through said pressure signal inlet to operate the valve stem to unseat the valve disc when the pressure signal increases above a predetermined value, a threaded hollow neck in said bonnet including a manually operated threaded rod therein for engaging the disc member to unseat the valve disc when the pressure signal to the control means fails and jack means in said manually operated rod for adjusting said screw means to change the tensional force in said tension spring to set said valve disc to unseat for a different value of pressure signal transmitted to the control means.

7. An automatic valve comprising a body having an inlet for passing fluid therein and an outlet for discharging fluid therefrom, a fluid-tight bonnet mounted on said body having an inlet therein for receiving a pressure signal therethrough, a valve seat in said body, a valve disc adapted to seat against said valve seat to control the flow of fluid through the body, a tension spring in said body fastened to said valve disc, a threaded valve stem fastened to said tension spring for moving said valve disc into an opened and closed position, and control means disposed in said bonnet for acting on said valve stem to seat and unseat said valve disc, said control means comprising a spring-loaded fluid-tight bellows means, a disc member forming the top of said bellows means, adjustable screw means mounted in said disc member in spaced relation with said valve stem for adjusting the tension in the first-mentioned spring, said bellows means being disposed in said bonnet to normally maintain said valve disc seated, said control means being operative by a pressure signal received through said pressure signal inlet to operate the valve stem to unseat the valve disc when the pressure signal increases above a predetermined value, a threaded hollow neck in said bonnet including a manually operated threaded rod therein for engaging the disc member to unseat the valve disc when the pressure signal to the control means fails and jack means in said manually operated rod for adjusting said screw means to change the tensional force in said tension spring to set said valve disc to unseat for a different value of pressure signal transmitted to the control means.

References Cited in the file of this patent

UNITED STATES PATENTS

| | | |
|---|---|---|
| 1,458,228 | Hagen | June 12, 1923 |
| 1,599,074 | Breer | Sept. 7, 1926 |
| 1,984,792 | Ford | Dec. 18, 1934 |
| 2,264,677 | Oxland | Dec. 2, 1941 |